United States Patent
Rodriguez et al.

(10) Patent No.: US 9,600,131 B2
(45) Date of Patent: Mar. 21, 2017

(54) INTEGRATED APPLICATION THAT CONTAINS SOFTWARE MODULES COUPLED TO A MESSAGE BUS

(75) Inventors: Jesus M. Rodriguez, Wake Forest, NC (US); Michael B. McCune, Beaverton, OR (US)

(73) Assignee: Red Hat, Inc., Raleigh, NC (US)

( * ) Notice: Subject to any disclaimer, the term of this patent is extended or adjusted under 35 U.S.C. 154(b) by 294 days.

(21) Appl. No.: 13/149,042

(22) Filed: May 31, 2011

(65) Prior Publication Data

US 2012/0311612 A1 Dec. 6, 2012

(51) Int. Cl.
*G06F 3/00* (2006.01)
*G06F 3/048* (2013.01)
*G06F 9/44* (2006.01)

(52) U.S. Cl.
CPC ............... *G06F 3/048* (2013.01); *G06F 8/38* (2013.01); *G06F 9/4443* (2013.01)

(58) Field of Classification Search
CPC .......... G06F 3/048; G06F 9/4443; G06F 8/28
See application file for complete search history.

(56) References Cited

U.S. PATENT DOCUMENTS

| | | | |
|---|---|---|---|
| 6,185,600 B1 * | 2/2001 | Spence et al. ................ | 709/203 |
| 6,222,533 B1 * | 4/2001 | Notani et al. ................ | 715/733 |
| 2002/0046301 A1 * | 4/2002 | Shannon et al. ............. | 709/328 |
| 2003/0056018 A1 * | 3/2003 | Pike et al. .................... | 709/310 |
| 2003/0137539 A1 * | 7/2003 | Dees ............................. | 345/762 |
| 2004/0111644 A1 * | 6/2004 | Saunders et al. ............ | 713/202 |
| 2004/0230901 A1 * | 11/2004 | Godwin et al. .............. | 715/513 |
| 2005/0149206 A1 * | 7/2005 | Krane ............................ | 700/17 |
| 2005/0246159 A1 * | 11/2005 | Perla et al. ...................... | 704/8 |
| 2008/0052253 A1 * | 2/2008 | Edwards ............... | G01D 4/002 705/412 |
| 2011/0119603 A1 * | 5/2011 | Peltz et al. .................... | 715/762 |

* cited by examiner

*Primary Examiner* — H S Sough
*Assistant Examiner* — Carina Yun
(74) *Attorney, Agent, or Firm* — Lowenstein Sandler LLP (57) ABSTRACT

A method and system for providing an integrated application that includes software modules coupled to a message bus. The software modules include applications of different degrees of complexity and different number of components, such as management applications, service applications, and other similar applications. A computer system receives a first input that selects a user interface (UI) to access the integrated application. The selected UI can be a specific UI associated with a software module, or an orchestrator UI that unifies individual styles of the specific UIs. The computer system receives, via the selected UI, a second input to access a destination module among the software modules. If the selected UI is the orchestrator UI, the second input is forwarded to the destination module via the message bus. If the selected UI is a specific UI, the second input is sent to the destination module via the selected specific UI.

20 Claims, 5 Drawing Sheets

INTEGRATED APPLICATION THAT CONTAINS SOFTWARE MODULES COUPLED TO A MESSAGE BUS

TECHNICAL FIELD

Embodiments of the present invention relate to a computer system, and more specifically, to integration of software modules that are coupled to a message bus.

BACKGROUND

Today's enterprises are increasingly dependent on software applications acquired from various sources for their daily operations. As the complexity of the applications grows, it becomes increasingly difficult to coordinate their operations. These applications may be implemented in different programming languages, provide different interfaces, and organize their data according to different schemas. Additionally, each application may be maintained and supported by a different support team (e.g., a different vendor) that has little knowledge of the technical details of the other applications used by an enterprise.

One approach for integrating the applications is to rewrite the code so that the applications can communicate with each other, share the same interface and use the same schema. However, rewriting the code can be time consuming and error prone. Further, after the code is rewritten, the original support teams for the applications may no longer be able to support the rewritten applications.

BRIEF DESCRIPTION OF THE DRAWINGS

The present invention is illustrated by way of example, and not by way of limitation, and can be more fully understood with reference to the following detailed description when considered in connection with the figures in which.

DETAILED DESCRIPTION

Described herein is a method and system for providing an integrated application that includes software modules coupled to a message bus. In one embodiment, a computer system receives a first input that selects a user interface (UI) to access the integrated application. The selected UI is one of specific UIs that are associated with the software modules, or an orchestrator UI that unifies individual styles of the specific UIs. The computer system receives, via the selected UI, a second input to access a destination module among the software modules. If the selected UI is the orchestrator UI, the second input is forwarded to the destination module via the message bus. If the selected UI is one of the specific UIs, the second input is sent to the destination module via the selected specific UI. The computer system then performs operations of the destination module.

In the description herein, the term "software module" refers to applications of different degrees of complexity and different number of components, such as management applications, service applications, and other similar applications. Embodiments of the present invention allow software modules that are independently developed to be integrated via a message bus and presented to an external entity (e.g., a user, client or agent) as one single application ("integrated application"). The integrated application can be presented as one single application via an orchestrator UI and an application programming interface (API) gateway. The software modules communicate with the orchestrator UI, the API gateway and with each other via the message bus. The data of the software modules are stored in a database and organized in schemas that may be different from each other. When needed, a user may choose to use a UI that is specifically associated with a software module instead of the orchestrator UI.

According to embodiments of the present invention, the integrated application includes services and applications as the software modules. Each application can be a self-sufficient, standalone software product that can function in the absence of other software modules in the integrated application. These services and applications can be acquired from different software vendors and can be used as parts of the integrated application without having to be rewritten.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Figure 1:
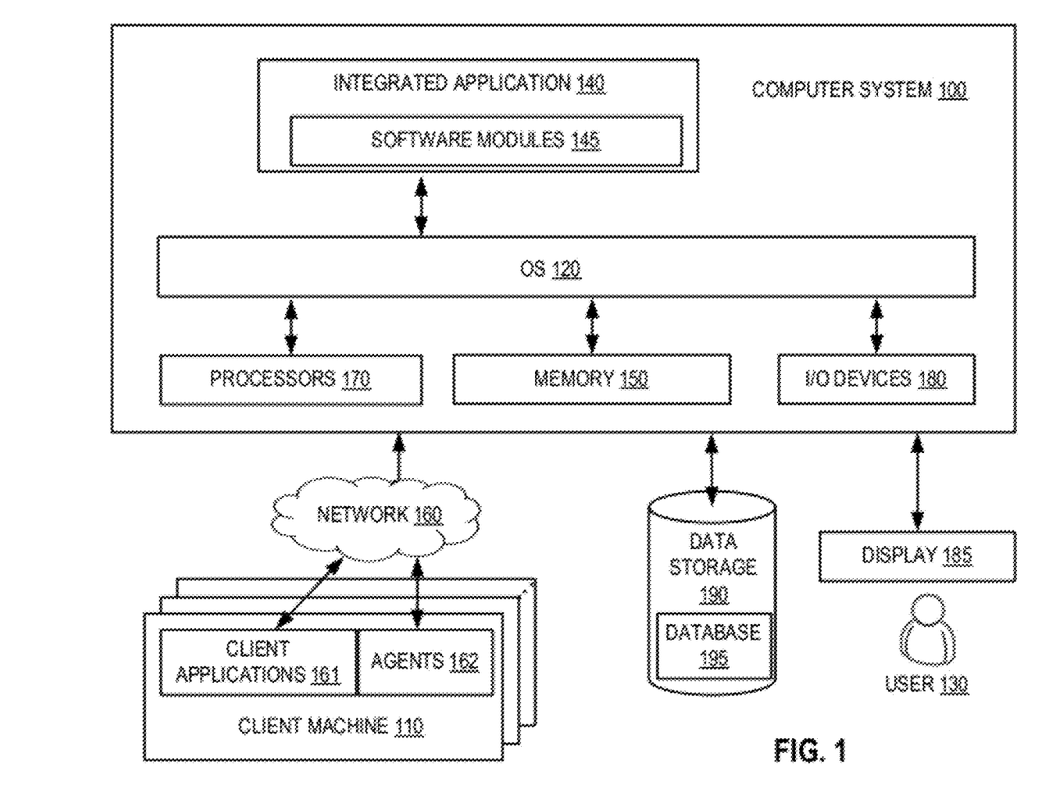
FIG. 1 is a block diagram of a computer system in which embodiments of the present invention may operate.

FIG. 1 is a block diagram that illustrates an embodiment of a computer system 100 in which embodiments of the present invention may operate. In one embodiment, the computer system 100 is coupled to one or more client machines 110 over a network 160. The client machine 110 may be a computer (e.g., a server, a workstation, a personal computer (PC), a laptop, or a similar computing device), a mobile phone, a hand-held computing device, a game station, a personal digital assistant (PDA), or a similar electronic device. In one embodiment, the client machine 110 hosts one or more client applications 161 and/or agents 162. Each of the client applications 161 and agents 162 communicates with the computer system 100 to receive data or services from the computer system 100.

In one embodiment, the network 160 that couples the computer system 100 and the client machines 110 may be a private network (e.g., a local area network (LAN), a wide area network (WAN), intranet, or a similar private network) or a public network (e.g., the Internet).

In one embodiment, the computer system 100 may include one or more server machines. Each server machine may include one or more processors 170, input/output (I/O) devices 180 and memory 150. The computer system 100 runs an operating system (OS) 120 for allocating system resources to processes that run on the computer system 100. The computer system 100 is also coupled to a data storage 190. The data storage 190 may include flash drives, optical and/or magnetic drives, mass storage devices (e.g., disks), or other storage devices. In one embodiment, the data storage 190 stores a database 195 that is used by the computer system 100.

According to one embodiment of the present invention, the computer system 100 runs an integrated application 140 that contains a number of software modules 145. The software modules 145 may be developed independently by different software vendors, implemented in different programming languages (e.g., Python, Perl, Java, C, or other programming languages), and/or organize data according to different schemas. An enterprise that acquires the software modules 145 may wish to present the software modules 145 to its users as a single, integrated application. At the same time, the enterprise may also wish to keep the functionalities of the software modules 145 separate to allow developers of each software module 145 to continue maintaining and improving the individual software module 145 without having knowledge of the other software modules 145. As the need of the enterprise changes, an administrator of the enterprise may add or remove any of the software modules 145 without having to change the existing/remaining software modules 145.

In one embodiment, the integrated application 140 presents a unified user interface (UI) to a user 130 of the computer system 100 through a display 185. The user 130 may be a system administrator or a consumer of the services provided by integrated application 140. In one embodiment, the integrated application 140 allows the user 130 to choose between the unified UI and a specific UI provided by a software module 145. The integrated application 140 also provides an application programming interface (API) gateway for the client application 161 and agent 162 to access the software modules 145. Additionally, the data of the integrated application 140 is organized according to the schemas of the software modules 145, where different software modules 145 can have different schemas. In one embodiment, the computer system 100 stores the data in the database 195.

Figure 2:
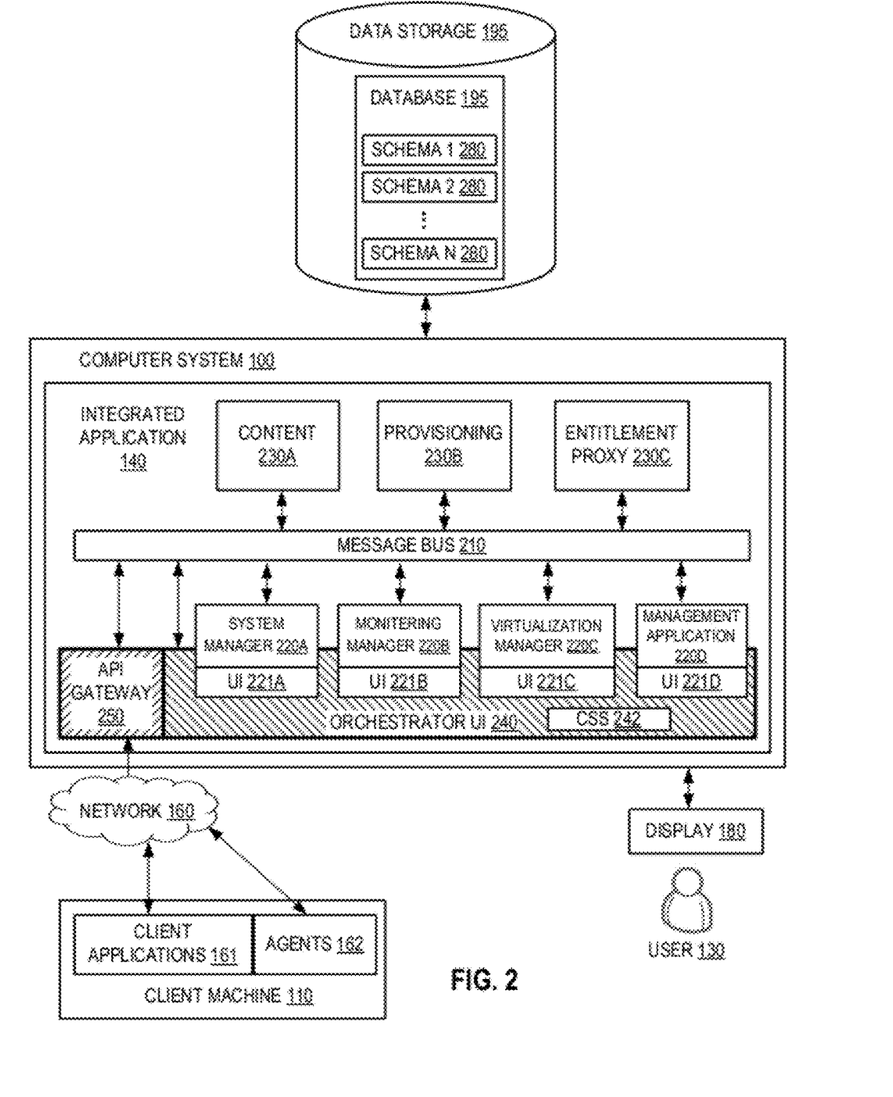
FIG. 2 is a block diagram of an integrated application that runs on a computer system.

FIG. 2 is a block diagram of the integrated application 140 that runs on the computer system 100. In one embodiment, the integrated application 140 includes two sets (or categories) of software modules that have different degrees of complexity and different number of components: a first set of software modules 220A-D (collectively referred to as software modules 220) and a second set of software modules 230A-C (collectively referred to as software modules 230). It is understood that each set can include any number of software modules. The first set of software modules 220 includes applications that handles system-wide management, such as the system manager 220A, the monitoring manager 220B, the virtualization manager 230C and the management application 220D. One common characteristic of the software modules 220 is that each of them provides a UI 221A, 221B, 221C, or 221D (collectively referred to as UIs 221). Each of the software modules 220 can be accessible by a user through its specific UI 221, or through an orchestrator UI 240. The orchestrator UI 240 provides a unified interface that unifies the UIs 221 of the software modules 220. Each UI 221 has a different style. The differences in styles are manifested to a user as a unique "look and feel." In one embodiment, the orchestrator UI 240 presents a unified style on the display 185 using the style defined in a unified cascading style sheet (CSS) 242. The unified CSS 242 presents a common format and a common style to improve the user experience when working with the integrated application 140. In one embodiment, the software modules 220 can be integrated into the integrated application 140 without modification (e.g., when they are from the same software vendor); examples of such software modules can include Red Hat® Satellite, JBOSS® Operations Network (JON), Red Hat® Enterprise Virtualization Manager (RHEV-M), and applications from the same software vendor. In an embodiment where some of the software modules 220 are from different software vendors, these software modules can be integrated into the integrated application 140 via software wrappers (which serve as adapters between these software modules and the integrated application 140). Each software module 220 is an application that can be a self-sufficient, standalone software product and can function independently of other software modules 220 and 230. When integrated together, the software modules 220 can complement each other to provide a superset of the functionality of each individual software module.

In one embodiment, the second set of software modules 230A-C (collectively referred to as software modules 230) include applications that provide specific services, which usually have a lower degree of complexity and fewer software components than the software modules 220. Each software modules 230 does not have an UI specifically associated with it. Instead, the software modules 230 are accessible through an API gateway 250, which accepts API calls from the client applications 161 and the agents 162. Although each software module 230 in the second set may provide a different API, the API gateway 250 integrates the different APIs to present a unified API to external entities (e.g., the client applications 161 and the agents 162). The API calls may be made in accordance with protocols such as Advanced Message Queuing Protocol (AMPQ), JavaScript Object Notation Remote Procedure Call (JSON RPC), Extensible Markup Language RPC (XML-RPC), Representation State Transfer (REST), or similar message exchange protocols. Examples of the second set of software modules 230 include service applications, such as the content service 230A, the provisioning service (e.g., Cobbler) 230B, the entitlement proxy service 230C, and other service applications. Each software module 230 provides a specific service. For example, the content service manages packages or software contents, and the provisioning service manages records and information of a computer system. Like the software modules 220, each software module 230 can also be a self-sufficient, standalone software product and can function independently of other software modules 220 and 230. When integrated together, the software modules 230 can complement each other to provide a superset of the services of each individual software module.

In one embodiment, the first set of software modules 220 may also be accessible by the client applications 161 and the agents 162 through the API gateway 250 using the API calls.

In one embodiment, the software modules 220, 230 in the integrated application 140 are coupled to a message bus 210 that transmits messages among the software modules 220, 230, the orchestrator UI 240 and the API gateway 250. Messages on the message bus 210 may be sent according to a standard protocol such as the AMPQ or any other messages exchange protocols. In one embodiment, when the orchestrator UI 240 or the API gateway 250 receives an input that is intended for one of the software modules 220 or 230, the orchestrator UI 240 or the API gateway 250 examines the request to determine its destination and then forwards the request to the destination software module via the message bus 210. In an alternative embodiment, when the orchestrator UI 240 or the API gateway 250 receives an input, the orchestrator UI 240 or the API gateway 250 publishes the information in the input on the message bus 210, which allows the intended recipient(s) to pull the information from the message bus 210. In an embodiment where an input is sent by the user 130 directly to one of the UIs 221, the UI 221 can forward the input to the associated software module 220 without routing through the message bus 210. After the destination module (which is one of the software modules 220 and 230) receives the input, the destination module may forward the input to one or more of the software modules 220, 230 via the message bus 210.

In one embodiment, each of the software modules 220, 230 includes a mechanism which enables the software module 220, 230 to communicate with the message bus 210. This mechanism can be part of the software modules 220, 230. Alternatively, this mechanism can be provided by pluggable software that is incorporated into the software modules 220, 230.

In one embodiment, the software modules 220, 230 organize their data according to schemas 280 that may be different from one another. The data is stored in the database 195. The database 195 keeps data using different schemas 280 separate.

Figure 3:
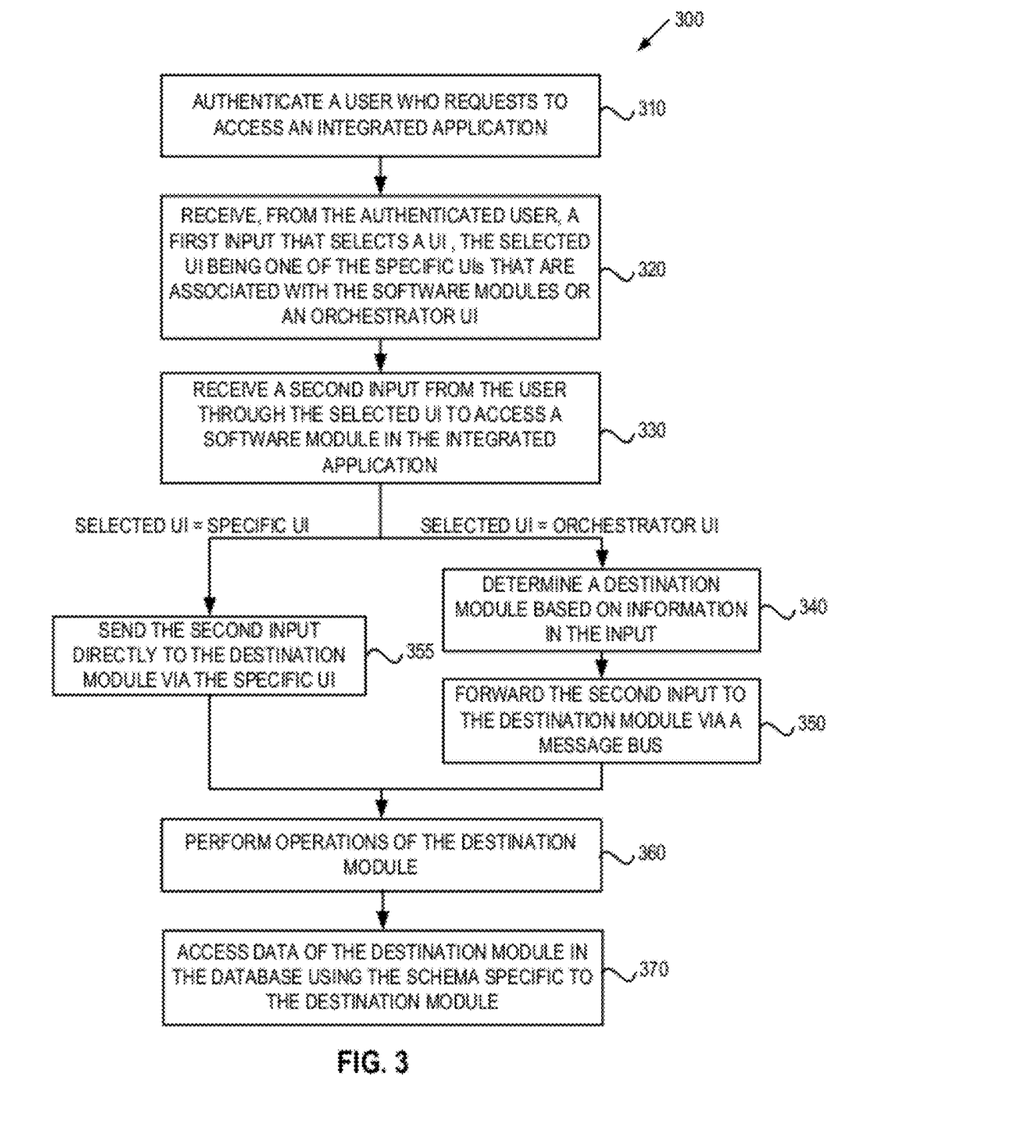
FIG. 3 is a flow diagram of one embodiment of a method for providing an integrated application to a user through a user interface (UI).

FIG. 3 is a flow diagram illustrating one embodiment of a method 300 for providing the integrated application 140 of FIG. 1 and FIG. 2 to a user. The method 300 may be performed by a computer system 500 of FIG. 5 that may comprise hardware (e.g., circuitry, dedicated logic, programmable logic, microcode, or other hardware logic), software (e.g., instructions run on a processing device), or a combination thereof. In one embodiment, the method 300 is performed by the computer system 100 of FIG. 1 and FIG. 2.

Referring to FIG. 3, in one embodiment, the method 300 begins when the computer system 100, upon receiving a login request, authenticates a user who requests to access the integrated application 140 (block 310). In one embodiment, the computer system 100 provides a single sign-on (SSO) mechanism. With the SSO, a user submits sign-in credentials only once and, if successfully authenticated, the user can gain access to all of the software modules in the integrated application 140. The SSO mechanism may be based on Kerberos, smart card, or a one-time password (OTP) token. Once the user is successfully authenticated, the computer system 100 presents the user with options for the user to select a UI (block 320). In one embodiment, the options may be presented to the user via the display 185, which lists the orchestrator UI 240 and all of the UIs 221 of FIG. 2 that are associated with the first set of software modules 220. The user may choose a UI among the orchestrator UI 240 and the UIs 221. The computer system 100 receives, via the selected UI, an input from the user to access one of the software modules ("destination module"), which can be any one of the software modules 220 and 230 (block 330). In one embodiment, if the selected UI is the orchestrator UI 240, the orchestrator UI 240 determines the destination module based on information in the input (block 340). The orchestrator UI 240 then forwards the input to the destination module via the message bus 210 (block 350). In an alternative embodiment, the orchestrator UI 240 may publish the input on the message bus 210, and the destination module can pull the input from the message bus 210. If the selected UI is one of the UIs 221 provided by the software modules 220, the selected UI can directly send the input to its associated software module without routing through the message bus 210 (block 355). After the destination module receives the input, the computer system 100 performs the operations of the destination module according to the input (block 360). The destination module may further interact with other software modules via the message bus 210. The destination module may also access its data in the database 195 using the schema specific to the destination module (block 370).

Figure 4:
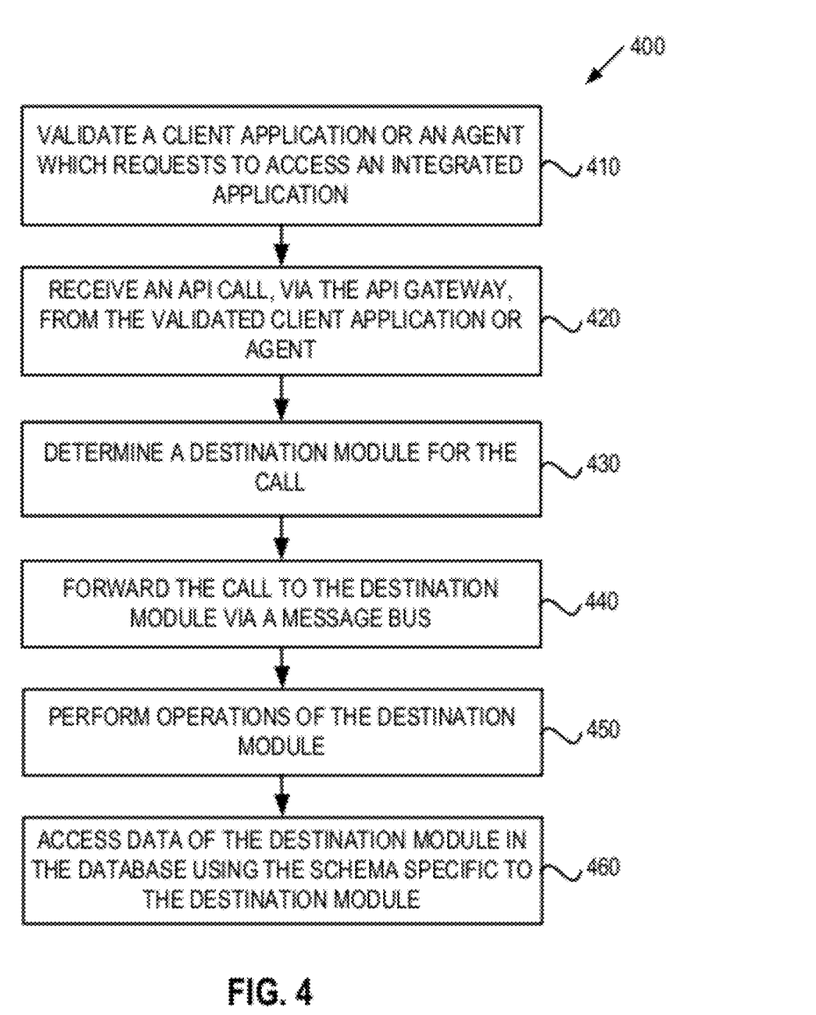
FIG. 4 is a flow diagram of one embodiment of a method for providing an integrated application via an application programming interface (API) gateway.

FIG. 4 is a flow diagram illustrating one embodiment of a method 400 for providing the integrated application 140 of FIG. 1 and FIG. 2 via the API gateway 250. The method 400 may be performed by a computer system 500 of FIG. 5 that may comprise hardware (e.g., circuitry, dedicated logic, programmable logic, microcode, or other hardware logic), software (e.g., instructions run on a processing device), or a combination thereof. In one embodiment, the method 400 is performed by the computer system 100 of FIG. 1 and FIG. 2.

Referring to FIG. 4, in one embodiment, the method 400 begins when the computer system 100, upon receiving an access request, validates a requester (e.g., the client application 161 or the agent 162) that requests access to the integrated application 140 (block 410). The techniques for validating a remote client application or agent are known and the details for the validation are omitted herein. After the requester is validated, the computer system 100 receives an API call, via the API gateway 250, from the requester to access one of the software modules in the integrated application 140 (block 420). In one embodiment, the API gateway 250 determines the destination module based on information in the API call (block 430). The API gateway 250 then forwards the request to the destination module via the message bus 210 (block 440). In an alternative embodiment, the API gateway 250 may publish the request on the message bus 210, and the destination module can pull the request from the message bus 210. After the destination module receives the request, the computer system 100 performs the operations of the destination module (block 450). The destination module may further interact with other software modules via the message bus 210. The destination module may also access its data in the database 195 using the schema specific to the destination module (block 460).

Figure 5:
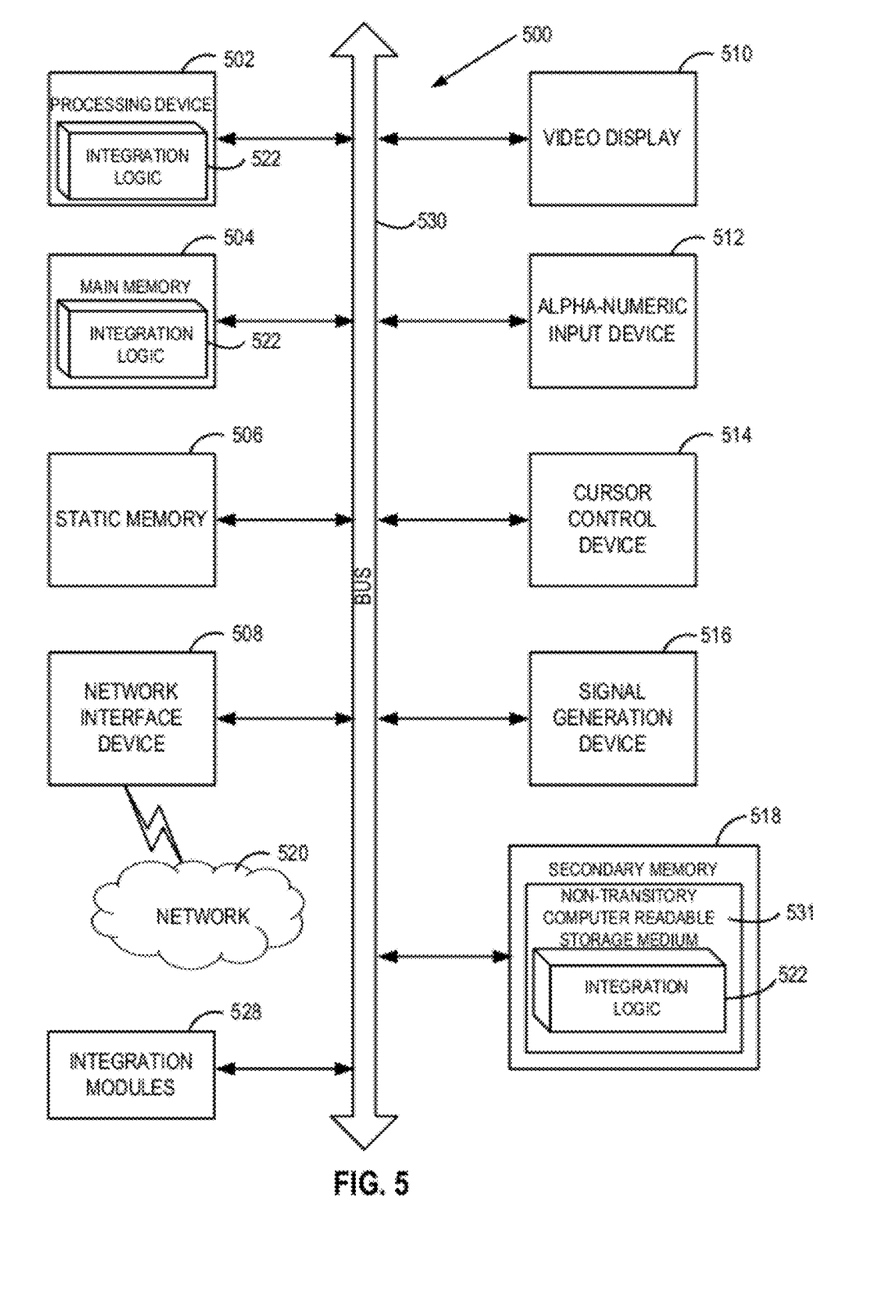
FIG. 5 illustrates a diagrammatic representation of a machine in the exemplary form of a computer system.

FIG. 5 illustrates a diagrammatic representation of a machine in the exemplary form of a computer system 500 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 500 includes a processing device 502, a main memory 504 (e.g., read-only memory (ROM), flash memory, dynamic random access memory (DRAM) such as synchronous DRAM (SDRAM), Rambus DRAM (RDRAM), or other variations of memory devices, a static memory 506 (e.g., flash memory, static random access memory (SRAM), or other variations of static memory), and a secondary memory 518 (e.g., a data storage device), which communicate with each other via a bus 530.

The processing device 502 represents one or more general-purpose processing devices such as a microprocessor, central processing unit, or the like. More particularly, the processing device 502 may be a complex instruction set computing (CISC) microprocessor, reduced instruction set computing (RISC) microprocessor, very long instruction word (VLIW) microprocessor, processor implementing other instruction sets, or processors implementing a combination of instruction sets. The processing device 502 may also be one or more special-purpose processing devices such as an application specific integrated circuit (ASIC), a field programmable gate array (FPGA), a digital signal processor (DSP), network processor, or the like. The processing device 502 is configured to execute integration logic 522 for performing the operations and steps discussed herein.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The secondary memory 518 may include a machine-readable storage medium (or more specifically a non-transitory computer readable storage medium 531) on which is stored one or more sets of instructions (e.g., integration logic 522) embodying any one or more of the methodologies or functions described herein (e.g., the integrated application 140 of FIGS. 1 and 2). The integration logic 522 may also reside, completely or at least partially, within the main memory 504 and/or within the processing device 502 during execution thereof by the computer system 500; the main memory 504 and the processing device 502 also constituting machine-readable storage media. The integration logic 522 may further be transmitted or received over a network 520 via the network interface device 508.

The non-transitory computer readable storage medium 531 may also be used to store the integration logic 522 persistently. While the non-transitory computer readable storage medium 531 is shown in an exemplary embodiment to be a single medium, the term "non-transitory computer readable storage medium" should be taken to include a single medium or multiple media (e.g., a centralized or distributed database, and/or associated caches and servers) that store the one or more sets of instructions. The term "non-transitory computer readable storage medium" shall also be taken to include any medium that is capable of storing or encoding a set of instructions for execution by the machine that causes the machine to perform any one or more of the methodologies of the present invention. The term "non-transitory computer readable storage medium" shall accordingly be taken to include, but not be limited to, solid-state memories, and optical and magnetic media.

The computer system 500 may additionally include integration modules 528 for implementing the functionalities of the integrated application 140 of FIGS. 1 and 2. The module 528, components and other features described herein (for example in relation to FIG. 1) can be implemented as discrete hardware components or integrated in the functionality of hardware components such as ASICS, FPGAs, DSPs or similar devices. In addition, the module 528 can be implemented as firmware or functional circuitry within hardware devices. Further, the module 528 can be implemented in any combination of hardware devices and software components.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "sending", "receiving", "forwarding", "performing", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes, or it may comprise a general purpose computer system selectively programmed by a computer program stored in the computer system. Such a computer program may be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method comprising:
receiving, by a processing device, a first input to select a user interface (UI) from one of a specific UI or an orchestrated UI to access an integrated application, the integrated application comprising one or more software components accessible via a message bus, the selected UI being one of specific UIs each having a respective different style associated with a respective one of the one or more software components or the orchestrator UI having a common style associated with each of the one or more software components, wherein at least one of the one or more software components is accessible via the one of the specific UIs and via the orchestrated UI;
receiving a second input via the selected UI to access a destination component among the software components;
determining whether or not to place the second input on the message bus in view of whether the selected UI is the orchestrator UI or the one of the specific UIs;
in response to the determining that the selected UI is the orchestrator UI, placing the second input on the message bus to allow retrieval of the second input by the destination component;
in response to the determining that the selected UI is the one of the specific UIs, sending, from the one of the specific UIs without using the message bus, the second input to the destination component; and
performing, by the processing device, operations of the destination component.

2. The method of claim 1, further comprising:
receiving, by the processing device, a call through an application programming interface (API) gateway which unifies different APIs provided by the one or more software components; and
forwarding, by the processing device, the call to the destination component through the message bus.

3. The method of claim 1, wherein performing operations of the destination component further comprises:
accessing a database using a schema specific to the destination component, the database storing data that is organized in multiple different schemas associated with the one or more software components.

4. The method of claim 1, wherein the orchestrator UI uses a common format defined in a cascaded style sheet (CSS) to unify the individual styles of the specific UIs.

5. The method of claim 1, wherein the one or more software components are written in different programming languages.

6. The method of claim 1, wherein each of the one or more software components is a standalone software product that functions independently of other software components.

7. The method of claim 1, wherein receiving the first input further comprises:
receiving sign-in credentials of a user; and
in response to determining that the sign-in credentials are authenticated, granting the user access to all of the one or more software components.

8. A system comprising:
a memory; and
a processing device, communicatively coupled to the memory, to:
receive a first input to select a user interface (UI) from one of a specific UI or an orchestrated UI access an integrated application, the integrated application comprising one or more software components accessible via a message bus, the selected UI being one of specific UIs each having a respective different style associated with a respective one of the one or more software components or the orchestrator UI having a common style associated with each of the one or more software components, wherein at least one of the one or more software components is accessible via the one of the specific UIs and via the orchestrated UI;
receive a second input via the selected UI to access a destination component among the software components;
determine whether or not to place the second input on the message bus in view of whether the selected UI is the orchestrator UI or the one of the specific UIs;
in response to determining that the selected UI is the orchestrator UI, place the second input on the message bus to allow retrieval of the second input by the destination component;
in response to determining that the selected UI is the one of the specific UIs, send, from the one of the specific UIs without using the message bus, the second input to the destination component; and
perform operations of the destination component.

9. The system of claim 8, further comprising:
data storage to store data that is organized in multiple different schemas associated with the one or more software components.

10. The system of claim 8, wherein the integrated application provides an application programming interface (API) gateway that unifies different APIs provided by the one or more software components.

11. The system of claim 8, wherein the orchestrator UI uses a common format defined in a cascaded style sheet (CSS) to unify the individual styles of the specific UIs.

12. The system of claim 8, wherein the one or more software components are written in different programming languages.

13. The system of claim 8, wherein each of the one or more software components is a standalone software product that functions independently of other software components.

14. A non-transitory computer readable storage medium stored thereon instructions that, when executed by a processing device, cause the processing device to:
receive, by the processing device, a first input to select a user interface (UI) from one of a specific UI or an orchestrated UI access an integrated application that comprises one or more software components accessible via a message bus, the selected UI being one of specific UIs each having a respective different style associated with a respective one of the one or more software components or the orchestrator UI having a common style associated with each of the one or more software components, wherein at least one of the one or more software components is accessible via the one of the specific UIs and via the orchestrated UI;
receive a second input via the selected UI to access a destination component among the software components;
determine whether or not to place the second input on the message bus in view of whether the selected UI is the orchestrator UI or the one of the specific UIs;

in response to the determining that the selected UI is the orchestrator UI, place the second input on the message bus to allow retrieval of the second input by the destination component;

in response to the determining that the selected UI is the one of the specific UIs, send, from the one of the specific UIs without using the message bus, the second input to the destination component; and perform operations of the destination component.

15. The non-transitory computer readable storage medium of claim 14, the processing device further to:

receive a call through an application programming interface (API) gateway which unifies different APIs provided by the one or more software components; and forward the call to the destination component through the message bus.

16. The non-transitory computer readable storage medium of claim 14, wherein the processing device is further to:

access a database using a schema specific to the destination component, the database storing data that is organized in multiple different schemas associated with the one or more software components.

17. The non-transitory computer readable storage medium of claim 14, wherein the orchestrator UI uses a common format defined in a cascaded style sheet (CSS) to unify the individual styles of the specific UIs.

18. The non-transitory computer readable storage medium of claim 14, wherein the software components are written in different programming languages.

19. The non-transitory computer readable storage medium of claim 14, wherein each of the one or more software components is a standalone software product that functions independently of other software components.

20. The non-transitory computer readable storage medium of claim 14, wherein to receive the first input, the processing device is further to:

receive sign-in credentials of a user; and in response to determining that the sign-in credentials are authenticated, grant the user access to all of the one or more software components.

* * * * *